(12) United States Patent
Gopalakrishnan et al.

(10) Patent No.: US 10,762,252 B2
(45) Date of Patent: Sep. 1, 2020

(54) TEMPERATURE COUPLING ALGORITHM FOR HYBRID THERMAL LATTICE BOLTZMANN METHOD

(71) Applicant: Dassault Systemes Simulia Corp., Johnston, RI (US)

(72) Inventors: Pradeep Gopalakrishnan, Woburn, MA (US); Raoyang Zhang, Burlington, MA (US); Hudong Chen, Newton, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 787 days.

(21) Appl. No.: 14/909,055

(22) PCT Filed: Jul. 31, 2014

(86) PCT No.: PCT/US2014/049129
§ 371 (c)(1),
(2) Date: Jan. 29, 2016

(87) PCT Pub. No.: WO2015/017648
PCT Pub. Date: Feb. 5, 2015

(65) Prior Publication Data
US 2016/0188768 A1 Jun. 30, 2016

Related U.S. Application Data

(60) Provisional application No. 61/860,392, filed on Jul. 31, 2013.

(51) Int. Cl.
*G06G 7/48* (2006.01)
*G06F 30/20* (2020.01)
(Continued)

(52) U.S. Cl.
CPC .............. *G06F 30/20* (2020.01); *G06F 17/10* (2013.01); *G06F 30/23* (2020.01); *G06F 2111/10* (2020.01)

(58) Field of Classification Search
None
See application file for complete search history.

(56) References Cited

U.S. PATENT DOCUMENTS 5,594,671 A * 1/1997 Chen ..................... G06F 15/803
702/50
5,606,517 A * 2/1997 Traub ................... G06F 17/5018
703/9

(Continued)

FOREIGN PATENT DOCUMENTS

| JP | 2011/191848 | 9/2011 |
| WO | WO 99/34308 | 7/1999 |
| WO | WO 2008021652 | 2/2008 |

OTHER PUBLICATIONS

Ladd, A. J. C., and R. Verberg. "Lattice-Boltzmann simulations of particle-fluid suspensions." Journal of Statistical Physics 104.5-6 (2001): 1191-1251.*

(Continued)

*Primary Examiner* — Rehana Perveen
*Assistant Examiner* — Nithya J. Moll
(74) *Attorney, Agent, or Firm* — Fish & Richardson P.C.

(57) ABSTRACT

A method includes simulating, in a lattice velocity set, transport of particles in a volume of fluid, with the transport causing collision among the particles; and generating a distribution function for transport of the particles, wherein the distribution function comprises a thermodynamic step and a particle collision step, and wherein the thermodynamic step is substantially independent of and separate from the particle collision step.

23 Claims, 8 Drawing Sheets

(51) Int. Cl.
*G06F 30/23* (2020.01)
*G06F 17/10* (2006.01)
*G06F 111/10* (2020.01)

(56) References Cited

U.S. PATENT DOCUMENTS

| | | | |
|---|---|---|---|
| 5,848,260 | A | 12/1998 | Chen |
| 5,953,239 | A | 9/1999 | Teixeira et al. |
| 6,915,245 | B1 | 7/2005 | Hinton |
| 7,209,873 | B1 | 4/2007 | Kliegel |
| 7,590,514 | B1 * | 9/2009 | Olovsson ............ G06F 17/5018 703/6 |
| 8,757,871 | B2 * | 6/2014 | Gruebele ........... G01N 21/6458 250/336.1 |
| 2010/0030534 | A1 | 2/2010 | Reich |
| 2013/0116997 | A1 | 5/2013 | Sun |

OTHER PUBLICATIONS

Karsch, Frithjof. "Lattice simulations of the thermodynamics of strongly interacting elementary particles and the exploration of new phases of matter in relativistic heavy ion collisions." Journal of Physics: Conference Series. vol. 46. No. 1. IOP Publishing, 2006.*
Bao, Yuanxun Bill, and Justin Meskas. "Lattice Boltzmann method for fluid simulations." Department of Mathematics, Courant Institute of Mathematical Sciences, New York University, New York (2011).*
Lee, Taehun, and Ching-Long Lin. "A stable discretization of the lattice Boltzmann equation for simulation of incompressible two-phase flows at high density ratio." Journal of Computational Physics 206.1 (2005): 16-47.*
Chen et al. Lattice Boltzmann Method for Fluid Flows. Annual Review Fluid Mechanics 1998.
International Search Report and the Written Opinion of the International Searching Authority for PCT/US2014/049129, dated Nov. 17, 2014, 10 pages.
Chen et al.; Lattice Boltzmann Method for Fluid Flows; Annual Review Fluid Mechanics 1998, http://mitran-lab.amath.unc.edu:8082/subversion/Papers/2011/Ve_Entrain_JCP_Spec_Issue_MMS/biblio/LBM/ChenDoolen_LBM_FluidFlows_AnnRev_FlMech_1998.pdf; pp. 329-364.
International Search Report and Written Opinion; PCT/US2014/049129; dated Nov. 17, 2014; 6 pp.
Supplemental European Search Report: EP Appln. No. 14832274.6; dated Apr. 3, 2017; 7 pages.
Petkov et al.; "Efficient LBM Visual Simulation on Face-Centered Cubic Lattices"; IEEE Transactions on Visualization and Computer Graphics; vol. 15, No. 5; Sep. 1, 2009; 13 pages.
Han et al.; "Modelling of thermal contact resistance within ghe framework of the thermal lattice Boltzmann method"; International Journal of Thermal Sciences, vol. 47, No. 10; Oct. 1, 2008; pp. 1276-1283.
Chatterjee et al.; "A hybrid lattice Boltzmann model for solid-liquid phase transition in presence of fluid flow"; Department of Mechanical Engineering, Physics Letters A; vol. 351, No. 4-5; Mar. 6, 2006; pp. 359-367.
Raabe, "Overview of the lattice Boltzmann method for nano- and microscale fluid dynamics in materials science and engineering"; Institute of Physics Publishing, Modelling and Simulation Materials Science and Engineering; vol. 12, No. 6; Nov. 1, 2004; pp. R13-R46.
Chinese Office Action w/ English Translation; CN Appln. No. 201480049496.X; dated Dec. 18, 2017; 21 pages.
Chen & Ohashi, "The foundation and its application of the lattice Boltzmann method," Simulation, Nippon-Steel Technical Information Center, Ltd., Sep. 15, 1998, vol. 17, No. 3, p. 43-49 (with abstract).
JP Office Action in Japanese Appln. No. 2016-507600, dated Jul. 10, 2018, 23 pages (with English translation).
Petkov et al, "Efficient LBM Visual Simulation on Face-Centered Cubic Lattices", IEEE Transactions on Visualization and Computer Graphics, IEEE, Feb. 27, 2009, vol. 15, No. 5, pp. 802-814.

* cited by examiner

TEMPERATURE COUPLING ALGORITHM FOR HYBRID THERMAL LATTICE BOLTZMANN METHOD

CLAIM OF PRIORITY

This application is a U.S. National Phase Application under 35 U.S.C. § 371 of International Patent Application No. PCT/US2014/049129, filed on Jul. 31, 2014, which claims the benefit of U.S. Provisional Patent Application Ser. No. 61/860,392, filed on Jul. 31, 2013, the entire contents of which are hereby incorporated by reference.

BACKGROUND

Lattice Boltzmann methods (LBM) (or Thermal Lattice Boltzmann methods (TLBM)) is a class of computational fluid dynamics (CFD) methods for fluid simulation. Instead of solving the Navier-Stokes equations, the discrete Boltzmann equation is solved to simulate the flow of a Newtonian fluid with collision models such as Bhatnagar-Gross-Krook (BGK). By simulating streaming and collision processes across a limited number of particles, the intrinsic particle interactions evince a microcosm of viscous flow behavior applicable across the greater mass.

SUMMARY

In general, this document describes techniques for simulating, in a lattice velocity set, transport of particles in a volume of fluid, with the transport causing collision among the particles; and generating a distribution function for transport of the particles, wherein the distribution function comprises a thermodynamic step and a particle collision step, and wherein the thermodynamic step is substantially independent of and separate from the particle collision step.

In some examples, a distribution function further comprises an advection step, and wherein the thermodynamic step is included in the distribution portion by augmenting the advection step with the thermodynamic step, rather than augmenting the particle collision step with the thermodynamic step. In other examples, the thermodynamic step includes a temperature of the volume of fluid during the transport. In still other examples, generating comprises: determining a post-collide distribution function $f_i'(x,t)$ for the collision at a particular location x in the volume of fluid at a particular time t, wherein $f_i'(x,t)=f_i(x,t)+C_i(x,t)$, wherein $C_i$ is a collision operator, and $f_i$ is a distribution function for the particles prior to the collision; deducting a fractional piece, $g_i(x, t)$, from the post-collide distribution function $f_i'(x, t)$ to obtain pre-advect particle density distribution function $f_i''(x,t)=f_i'(x, t)-g_i(x, t)$, with a portion of the particles $f_i'(x, t)-g_i(x, t)$ being advected to another location in the volume of fluid, with $g_i(x, t)$ representing a distribution of particles that are unadvected; simulating an advection of the portion of the particles to the other location in the volume of fluid at a time t+Δt, with the other location being represented as (x+$c_i$Δt), with $c_i$ being a velocity vector of the particles prior to collision, and with Δt being an interval between the particular time t and another point in time; obtaining, based on simulation of the advection, a density distribution function $f_i(x, t+\Delta t)$ of the advected particles, wherein $\hat{f}_i(x, t+\Delta t)+g_i(x, t)=f_i''(x-c_i\Delta t, t)$, and wherein $\hat{f}_i(x, t+\Delta t)$ is a distribution of particles at location x advected from location x−$c_i$; adding the previously deducted piece, $g_i(x, t)$, back to the density distribution function $f_i(x, t+\Delta t)$ to form a post-advect density distribution function $$f_i(x,t+\Delta t)=\hat{f}_i(x,t+\Delta t)+g_i(x,t)=f_i''(x-c_i\Delta t,t)+g_i(x,t);$$

computing mass, momentum and temperature of the particles at location x at time t+Δt; determining $g_i(x, t+\Delta t)$, using the computed temperature, mass and momentum; and adding a difference of $g_i(x, t+\Delta t)-g_i(x, t)$ to moving state $f_i(x,t)+C_i(x,t)$.

In some examples, $g_i$ is defined in accordance with $$g_i = \rho w_i\left[1 - \frac{P(\rho, T)}{\rho T_0}\right];$$

wherein ρ is fluid density; wherein $T_0$ is a constant lattice temperature; wherein P is pressure in the volume of fluid; wherein T is the computed temperature; and wherein $w_i$ is a constant weighting factor. The generated distribution function is in accordance with:

$$f_i(x+c_i\Delta t,t+\Delta t)=f_i(x,t)+C_i(x,t)+[g_i(x+c_i\Delta t,t+\Delta t)-g_i(x,t)];$$

wherein x is a particular location within the volume; wherein t is a particular first point in time; wherein i is an index number of lattice velocities in the set; wherein $c_i$ is a velocity vector of the particles prior to collision; wherein $C_i$ is a collision operator; wherein Δt is an interval between the first point in time and a second point in time; wherein $g_i$ is the thermodynamic step; and wherein $f_i$ is a distribution function for the particles at location x at time t.

In some examples, the method includes conserving the mass by modifying a stop state to be in accordance with:

$$f_0(x, t + \Delta t) = f_0(x, t) + C_0(x, t) - \sum_{i=1}^{i=q}[g_i(x, t + \Delta t) - g_i(x, t)].$$

In other examples, the particle collision step includes an isothermic equilibrium distribution function. In other examples, the distribution function is a distribution function for the particles at a location x+$c_1$Δt and at a time t+Δt and is represented as:

$$f_i(x+c_i\Delta t,t+\Delta t)=f_i(x,t)+C_i(x,t)+[g_i(x+c_i\Delta t,t)-g_i(x,t)];$$

wherein x is a particular location within the volume; wherein t is a particular first point in time; wherein i is an index number of lattice velocities in the set; wherein $C_i$ is a collision operator; wherein $c_i$ is a velocity vector of the particles prior to collision; wherein Δt is an interval between the first point in time and a second point in time; wherein $g_i$ is the thermodynamic step; and wherein $f_i$ a distribution function for the particles at location x at time t. In still other examples, $g_i$ is defined in accordance with;

$$g_i = \rho w_i\left[1 - \frac{P(\rho, T)}{\rho T_0}\right];$$

wherein ρ is fluid density; wherein $T_0$ is a constant lattice temperature; wherein P is pressure in the volume of fluid; wherein T is an actual temperature of the fluid; and wherein $w_i$ is a constant weighting factor. In some examples, the lattice velocity set is based on the Lattice Boltzmann method.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

The systems and method and techniques may be implemented using various types of numerical simulation approaches such as the Shan-Chen method for multi-phase flow and the Lattice Boltzmann formulation. Further information about the Lattice Boltzmann formulation will be described herein. However, the systems and techniques described herein are not limited to simulations using the Lattice Boltzmann formulation and can be applied to other numerical simulation approaches.

The systems and techniques may be implemented using a lattice gas simulation that employs a Lattice Boltzmann formulation. The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

In an enhanced system, the state vector at each lattice site includes many more bits (e.g., 54 bits for subsonic flow) to provide variation in particle energy and movement direction, and collision rules involving subsets of the full state vector are employed. In a further enhanced system, more than a single particle is permitted to exist in each momentum state at each lattice site, or voxel (these two terms are used interchangeably throughout this document). For example, in an eight-bit implementation, 0-255 particles could be moving in a particular direction at a particular voxel. The state vector, instead of being a set of bits, is a set of integers (e.g., a set of eight-bit bytes providing integers in the range of 0 to 255), each of which represents the number of particles in a given state.

In a further enhancement, Lattice Boltzmann Methods (LBM) use a mesoscopic representation of a fluid to simulate 3D unsteady compressible turbulent flow processes in complex geometries at a deeper level than possible with conventional computational fluid dynamics ("CFD") approaches. A brief overview of LBM method is provided below.

Boltzmann-Level Mesoscopic Representation

It is well known in statistical physics that fluid systems can be represented by kinetic equations on the so-called "mesoscopic" level. On this level, the detailed motion of individual particles need not be determined. Instead, properties of a fluid are represented by the particle distribution functions defined using a single particle phase space, $f=f(x, v)$, where x is the spatial coordinate while v is the particle velocity coordinate. The typical hydrodynamic quantities, such as mass, density, fluid velocity and temperature, are simple moments of the particle distribution function. The dynamics of the particle distribution functions obeys a Boltzmann equation:

$$\partial_t f + v \nabla_x f + F(x,t) \nabla_v f = C\{f\}, \quad \text{Eq. (1)}$$

where F(x, t) represents an external or self-consistently generated body-force at (x,t). The collision term C represents interactions of particles of various velocities and locations. It is important to stress that, without specifying a particular form for the collision term C, the above Boltzmann equation is applicable to all fluid systems, and not just to the well-known situation of rarefied gases (as originally constructed by Boltzmann).

Generally speaking, C includes a complicated multi-dimensional integral of two-point correlation functions. For the purpose of forming a closed system with distribution functions $f$ alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}), \quad \text{Eq. (2)}$$

where the parameter τ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force. Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\in\{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x,v,t)$, it is only necessary to track a finite set of discrete distributions, $f_i(x, t)$ with the subscript labeling the discrete velocity indices. The key advantage of dealing with this kinetic equation instead of a macroscopic description is that the increased phase space of the system is offset by the locality of the problem.

Due to symmetry considerations, the set of velocity values are selected in such a way that they form certain lattice structures when spanned in the configuration space. The dynamics of such discrete systems obeys the LBE having the form $f_i(x+c_i, t+1)-f_i(x, t)-C_i(x, t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x, t)$ obey the Navier-Stokes equations in the macroscopic limit. These moments are defined as:

$$\rho(x, t) = \sum_i f_i(x, t); \quad \text{Eq. (3)}$$

$$\rho u(x, t) = \sum_i c_i f_i(x, t);$$

$$DT(x, t) = \sum_i (c_i - u)^2 f_i(x, t),$$

where $\rho$, $u$, and $T$ are, respectively, the fluid density, velocity and temperature, and $D$ is the dimension of the discretized velocity space (not at all equal to the physical space dimension).

Other features and advantages will be apparent from the following description, including the drawings, and the claims.

DESCRIPTION

A. Overview

Figure 1:
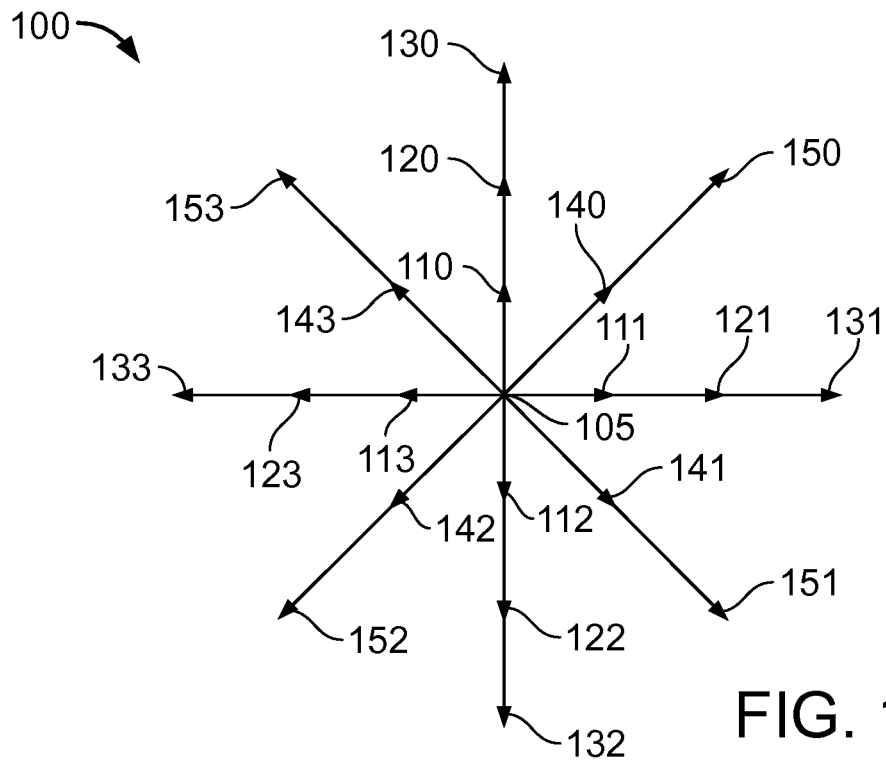
FIGS. 1 and 2 illustrate velocity components of two LBM models.

A system consistent with this disclosure couples temperature to the LBM, by removing the temperature coupling out of the collision step and introducing the temperature coupling into the LBM as a separate thermodynamic step that incorporates the temperature. By introducing a thermodynamic step into the distribution function (that is generated using LBM), this distribution function can be used to represent simulation of high Mach and high temperature range applications (because the temperature is not coupled into the LBM by modifying a first order term, which imposes a temperature range limit).

B. Model Simulation Space

In a LBM-based physical process simulation system, fluid flow may be represented by the distribution function values $f_i$, evaluated at a set of discrete velocities $c_i$. The dynamics of the distribution function is governed by Equation 4 where $f_i(0)$ is known as the equilibrium distribution function, defined as:

$$f_\alpha^{(0)} = w_\alpha \rho \left[1 + u_\alpha \left| \frac{\mu_\alpha^2 - \mu^2}{2} \right| \frac{\mu_\alpha(\mu_\alpha^2 - 3\mu^2)}{6} \right] \quad \text{Eq. (4)}$$

where $$u_\alpha = \frac{c_i u}{T} \quad u_\alpha = \frac{c_i \eta}{T}.$$

$$f_i(x + e_i, t+1) - f_i(x, t) = \frac{1}{\tau}\left[f_i^{(eq)}(x, t)\right] \quad \text{Eq. (5)}$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision operator," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass ρ and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
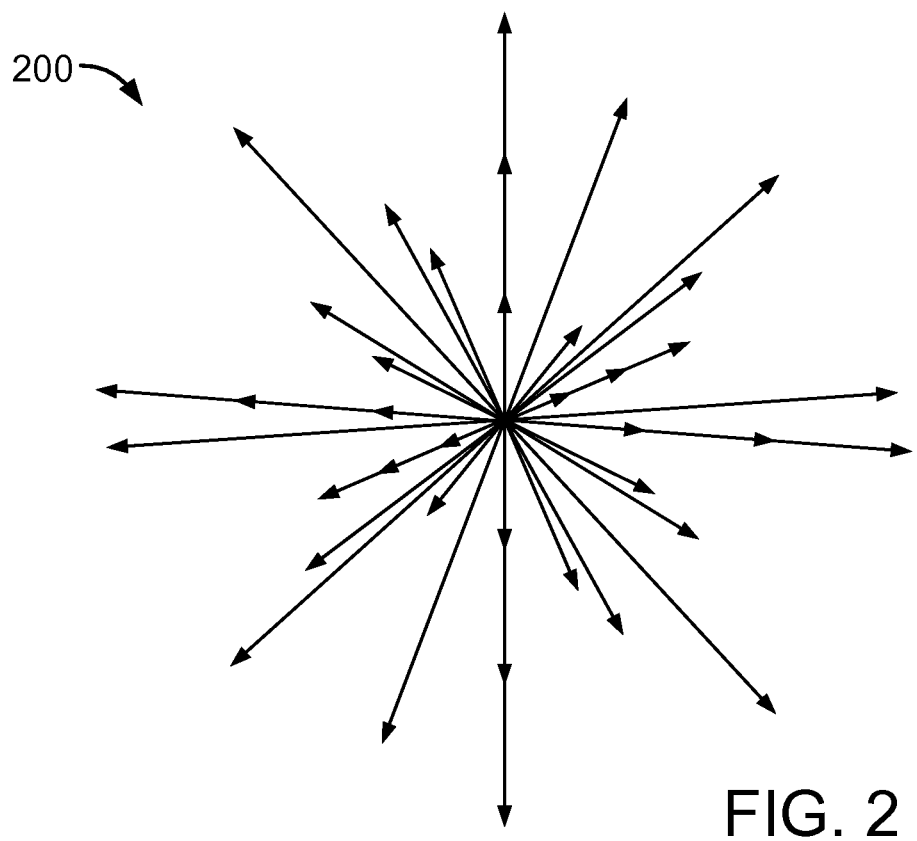

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
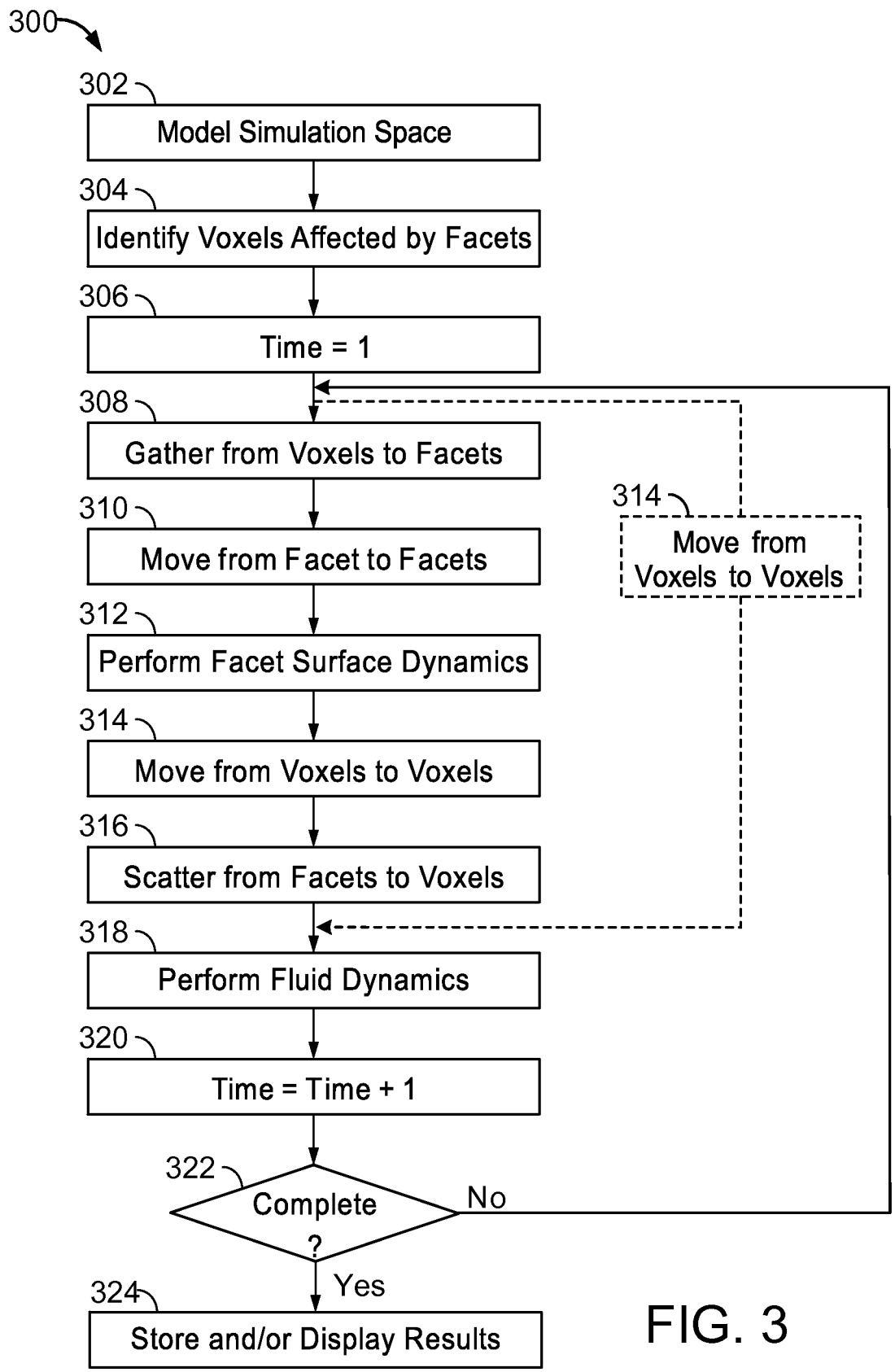
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v \qquad \text{Eq. (6)}$$

The characteristic length of an object represents large scale features of the object.

For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i$ (x, t), where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity c, of each state is indicated with its "speed" in each of the three dimensions as follows:

$$c_i = (c_{ix}, c_{iy}, c_{iz})$$ Eq. (7)

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
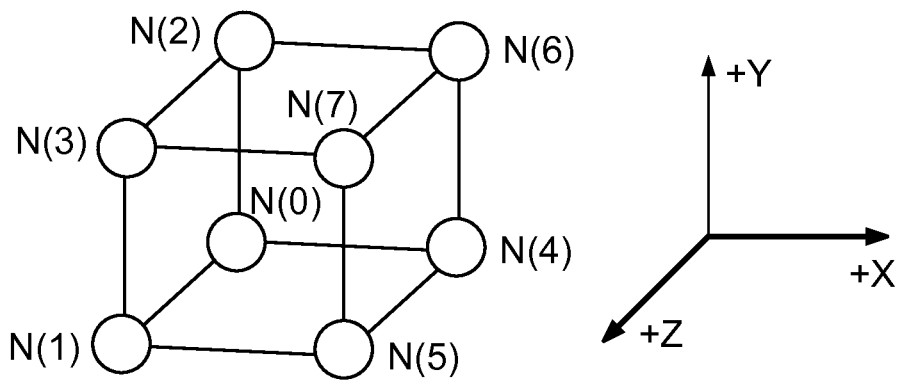
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i$ (n), where n represents the relative position of the lattice site within the microblock and $n \in \{0, 1, 2, \ldots, 7\}$. A microblock is illustrated in FIG. 4.

Figure 5A:
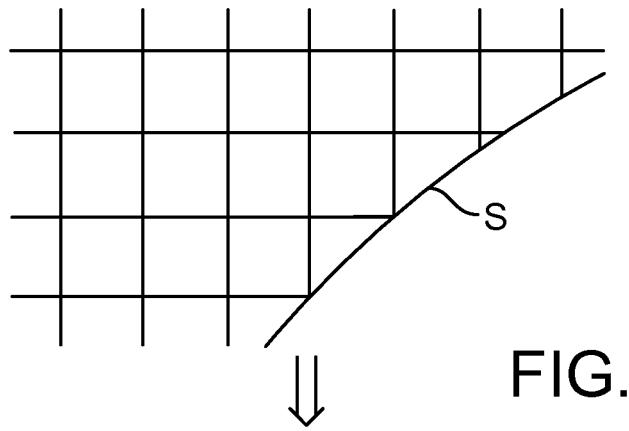
FIGS. 5A and 5B are illustrations of lattice structures used by the system of FIG. 3.
Figure 5B:
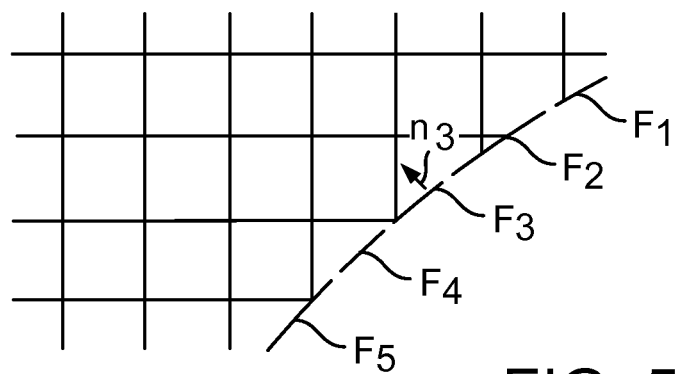

Referring to FIGS. 5A and 5B, a surface S is represented in the simulation space (FIG. 5B) as a collection of facets $F_\alpha$:

$$S = \{F_\alpha\}$$ Eq. (8)

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
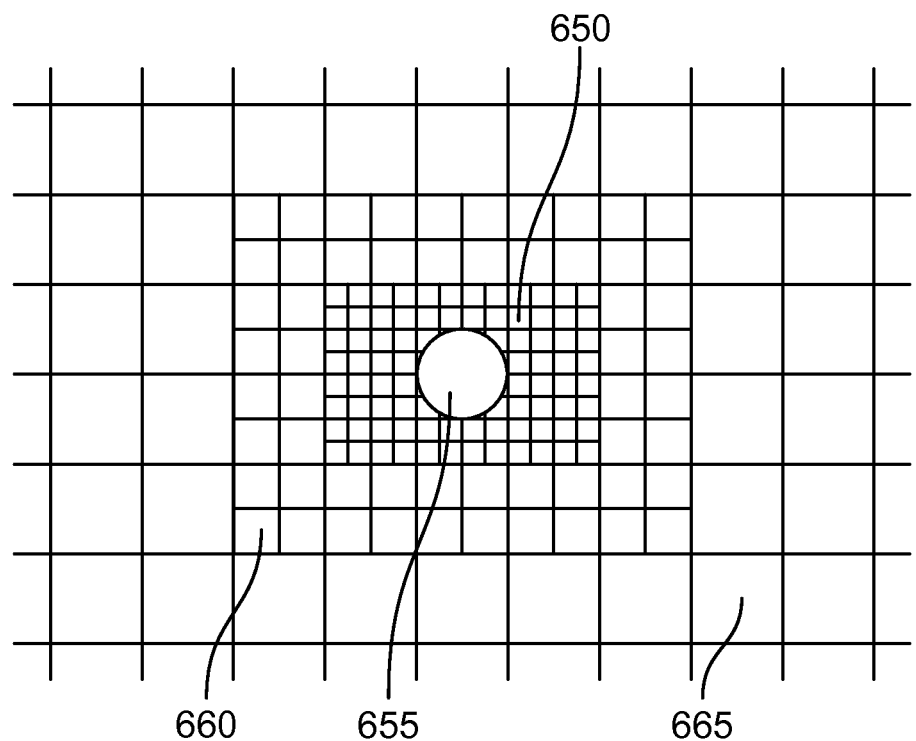
FIGS. 6 and 7 illustrate variable resolution techniques.
Figure 7:
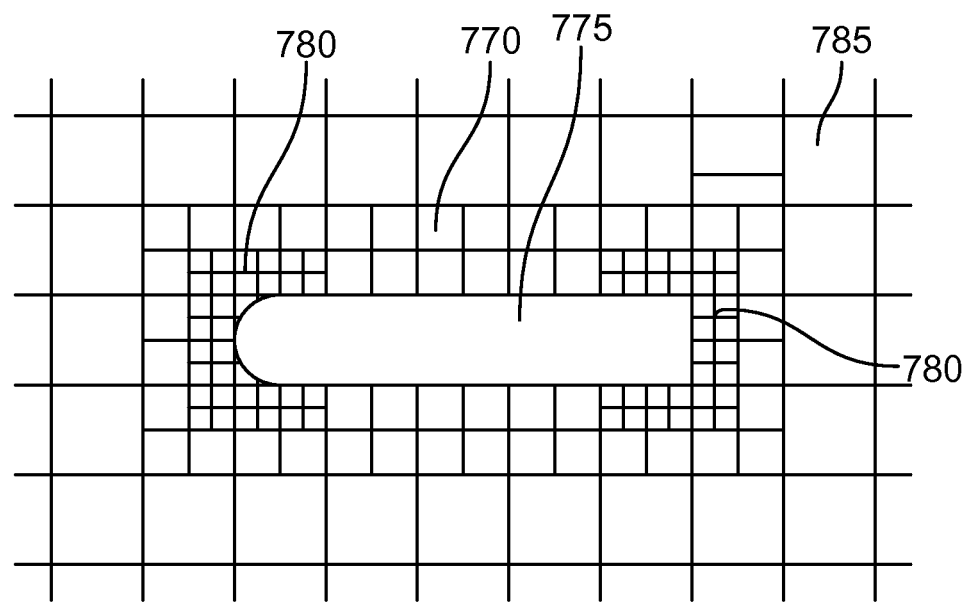

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected by Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
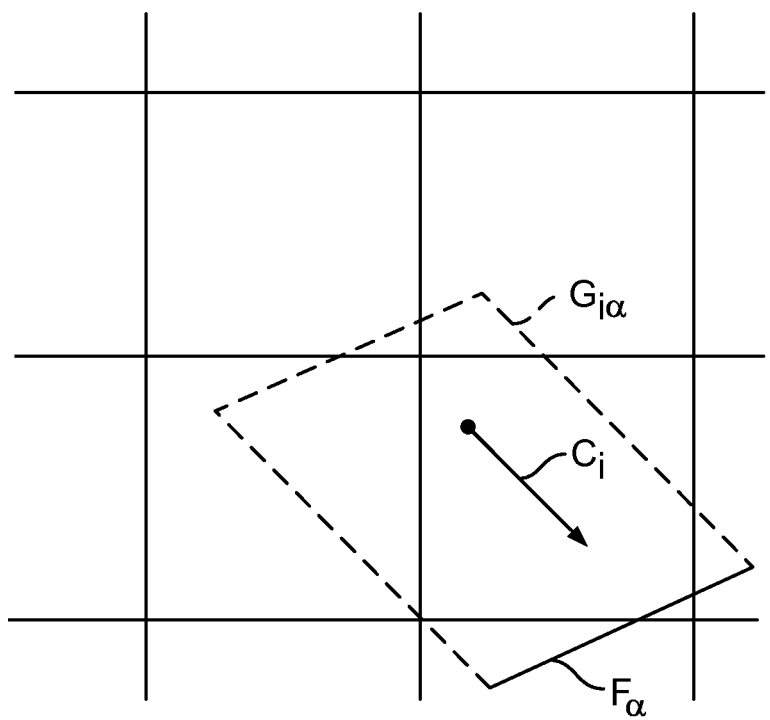
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha$$ Eq. (9)

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x).$$ Eq. (10)

$$\Gamma_{i\alpha}(x) = N_i(x) V_{i\alpha}(x)$$ Eq. (10)

When the parallelepiped $G_{i\alpha}$ is intersected by one or more facets, the following condition is true:

$$V_{i\alpha} = \Sigma V_\alpha(x) + \Sigma V_{i\alpha}(\beta)$$ Eq. (11)

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x) \quad \text{Eq. (12)}$$

D. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel $N(x)$ and a facet $F_\alpha$ is:

$$\Gamma_{i\alpha}(x) = N_i(x) V_{i\alpha}(x) \quad \text{Eq. (13)}$$

From this, for each state i directed toward a facet $F_\alpha$ ($c_i n_\alpha < 0$), the number of particles provided to the facet $F_\alpha$ by the voxels is:

$$\Gamma_{i\alpha V \to F} = \sum_x \Gamma_{i\alpha}(x) = \sum_x N_i(x) V_{i\alpha}(x) \quad \text{Eq. (14)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 10:
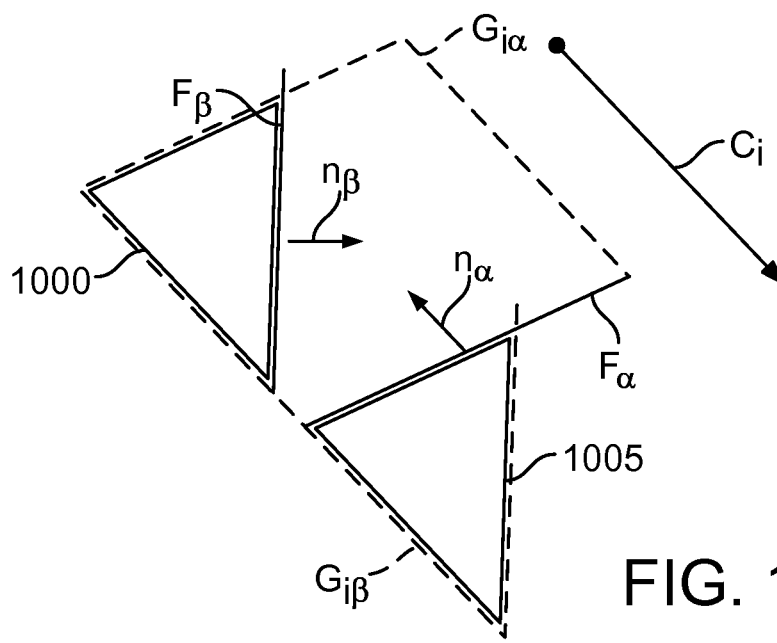
FIG. 10 illustrates movement of particles from a surface to a surface.

Next, particles are moved between facets (step 310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) / V_{i\alpha} \quad \text{Eq. (15)}$$

where $\Gamma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1) V_{i\alpha}(\beta) / V_{i\alpha} \quad \text{Eq. (16)}$$

and the total flux of state i particles into the facet is:

$$\Gamma_{iIN}(\alpha) = \Gamma_{i\alpha V \to F} + \Gamma_{i\alpha F \to F} = \quad \text{Eq. (17)}$$
$$\sum_x N_i(x) V_{i\alpha}(x) + \sum_\beta \Gamma_i(\beta, t-1) V_{i\alpha}(\beta) / V_{i\alpha}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha) = \Gamma_{iIN}(\alpha) / V_{i\alpha} \quad \text{Eq. (18)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V \quad \text{Eq. (19)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \quad \text{Eq. (20)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
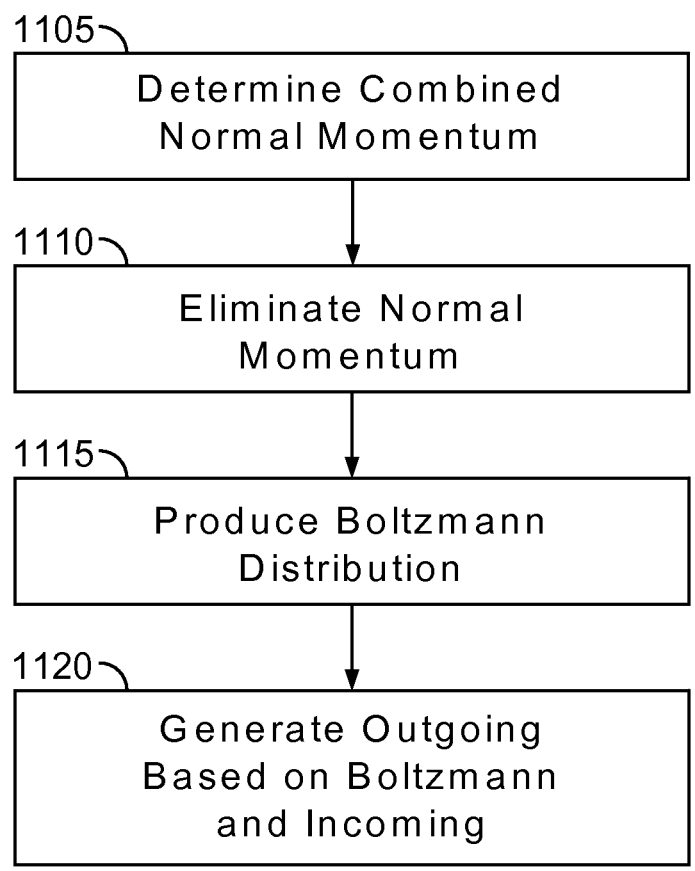
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \qquad \text{Eq. (21)}$$

for all i. From this, the normal momentum $P_n(\alpha)$ is determined as:

$$P_n(\alpha) = n_\alpha \cdot P(\alpha) \qquad \text{Eq. (22)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha)V_{i\alpha} \qquad \text{Eq. (23)}$$

Using this difference, the outgoing flux distribution is:

$$\Gamma_{iOUT}(\alpha) = N_{n-\beta i}(\alpha)V_{i\alpha} - \Delta\Gamma_{i^*}(\alpha), \qquad \text{Eq. (24)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = \qquad \text{Eq. (25)}$$
$$N_{n-\beta i}(\alpha)V_{i\alpha} - \Delta\Gamma_{i^*}(\alpha) + C_f(n_\alpha \cdot c_i)[N_{n-\beta i^*}(\alpha) - N_{n-\beta i}(\alpha)]V_{i\alpha} +$$
$$(n_\alpha \cdot c_i)(t_{1\alpha} \cdot c_i)\Delta N_{j,1}V_{i\alpha} + (n_\alpha \cdot c_i)(t_{2\alpha} \cdot c_i)\Delta N_{j,2}V_{i\alpha}$$

for $n_\alpha c_i > 0$ $n_\alpha c_i > 0$, where $C_f$ is a function of skin friction, $t_{i\alpha}$ is a first tangential vector that is perpendicular to $n_\alpha$, $t_{2\alpha}$, is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2_{j^2}}\left(n_\alpha \cdot \sum_i c_i c_i N_{n-Bi}(\alpha) \cdot t_{1,2\alpha}\right) \qquad \text{Eq. (26)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho, \qquad \text{Eq. (27)}$$

where $\rho$ is the density of the facet distribution:

$$\rho = \sum_i N_i(\alpha) \qquad \text{Eq. (28)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha)V_{i\alpha}. \qquad \text{Eq. (29)}$$

The outgoing flux distribution then becomes:

$$\Gamma_{iOUT}(\alpha) = N_{n-\beta i}(\alpha)V_{i\alpha} - \Delta\Gamma_{i^*}(\alpha) + C_f(n_\alpha c_i)[N_{n-\beta i^*}(\alpha) - N_{n-\beta i}(\alpha)]V_{i\alpha}, \qquad \text{Eq. (30)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_f p_\alpha u_\alpha A_\alpha \qquad \text{Eq. (31)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{j_i} \cdot n_\alpha < 0} \Gamma_{\alpha jiIN} - \sum_{i,c_{j_i} \cdot n_\alpha > 0} \Gamma_{\alpha jiOUT} \qquad \text{Eq. (32)}$$

where the index j denotes the energy of the state i. This energy difference is then used to generate a difference term:

$$\delta\Gamma_{\alpha j i} = V_{i\alpha}\Delta\Gamma_{\alpha m j} \Big/ \sum_{i, c_{j i} \cdot n_{\alpha} < 0} V_{i\alpha} \qquad \text{Eq. (33)}$$

for $c_{ji}n_\alpha>0$. This difference term is used to modify the outgoing flux so that the flux becomes:

$$\Gamma_{\alpha j i O U T f} = \Gamma_{\alpha j i O U T} + \delta\Gamma_{\alpha j i} \qquad \text{Eq. (34)}$$

for $c_{ji}n_\alpha>0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
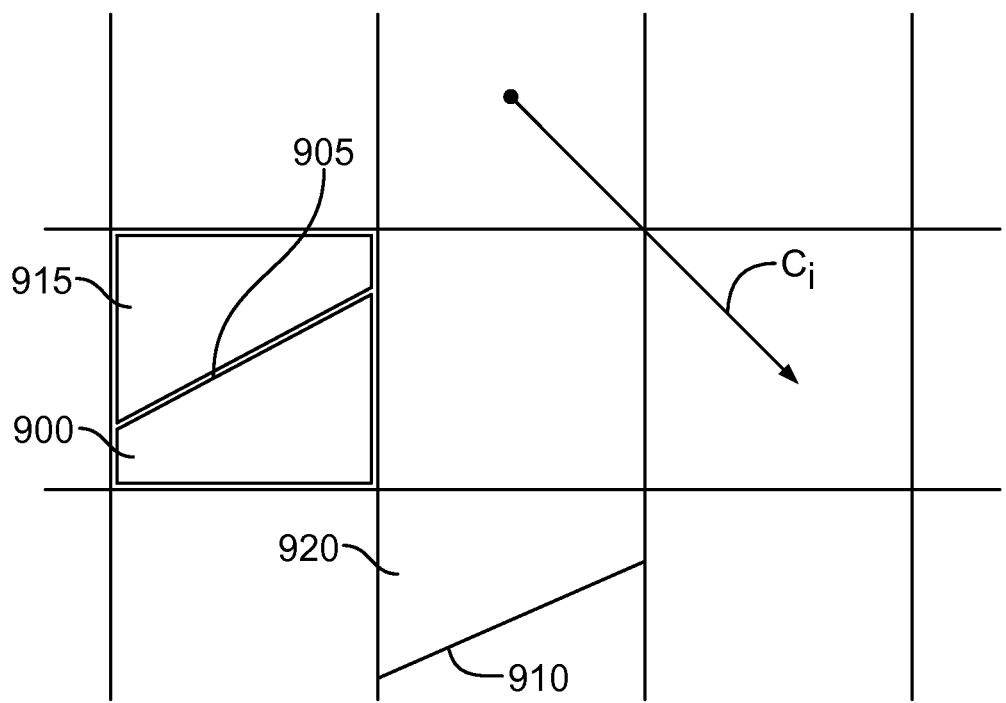
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \qquad \text{Eq. (35)}$$

where N(x) is the source voxel.

6. Scatter from Facets to Voxels

Next, the outgoing particles from each facet are scattered to the voxels (step 316). Essentially, this step is the reverse of the gather step by which particles were moved $$N_{\alpha i F \rightarrow V} = \frac{1}{P_{f(x)}} V_{\alpha i}(x)\Gamma_{\alpha i O U T_f} \Big/ V_{\alpha i} \qquad \text{Eq. (36)}$$

from the voxels to the facets. The number of state i particles that move from a facet $F_\alpha$ to a voxel N(x) is:

where $P_f(x)$ accounts for the volume reduction of partial voxels. From this, for each state i, the total number of particles directed from the facets to a voxel $N_{(x)}$ is:

$$N_{i F \rightarrow V} = \frac{1}{P_{f(x)}} \sum_\alpha V_{\alpha i}(x)\Gamma_{\alpha i O U T_f} \Big/ V_{\alpha i} \qquad \text{Eq. (37)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Hybrid Thermal Lattice Boltzmann Method

The Lattice Boltzmann Method (LBM) is employed as an alternate to conventional Computational Fluid dynamics (CFD) for a wide range of industrial applications in the near incompressible limit. For thermal applications, due to lack of H-theorem, LB solvers with energy conservation are highly unstable and require higher order models to provide accurate results. Further applying boundary condition for energy in addition to mass and momentum requires complex algorithms. To avoid these difficulties, most of the LBM methods use either a separate finite difference solver or a Lattice Boltzmann scalar solver for energy. For purposes of convenience, the numbering of the below equations will re-start at (1.0).

The standard isothermal LBM is given by the following equation:

$$f_i(x+c_i\Delta t, t+\Delta t) = f_i(x,t) + C_i(x,t) \quad (1.0)$$

where $f_i(x, t)$ is the particle distribution function for velocity value $c_i$ at $(x, t)$ and $C_i(x, t)$ is the particle collision operator. The most commonly used collision operator, for example, has the BGK form:
(1.1)

$$C_i(x, t) = -\frac{1}{\tau}[f_i(x, t) - f_i^{eq}(x, t)] \quad (1.1)$$

In equation 1.1, $f_i(x,t)$ is the particle distribution function and $\tau$ is the relaxation time.

The standard equilibrium distribution, $f_i^{eq}$, is given by, $$f_i^{eq} = \rho \omega_i \left[ 1 + \frac{c_i \cdot u}{T_0} + \frac{(c_i \cdot u)^2}{2T_0^2} - \frac{u^2}{2T_0} + \frac{(c_i \cdot u)^3}{6T_0^3} - \frac{(c_i \cdot u)u^2}{2T_0^2} + \dots \right] \quad (1.2)$$

where the constants weighting factors, $w_i$, and lattice temperature, $T_0$, are based on the lattice set. The purpose of weighting factors is to satisfy moment isotropy up to an expected order. For example, for D3Q19, the $T_0$ value is (⅓) and the weighting factors satisfy moment isotropy up to second order. The above isothermal LBM results in the equation of state, $P=\rho T_0$. In this example, P is pressure (e.g., in N m$^{-2}$), $\rho$ is density (e.g., in kg m$^{-3}$) and $T_0$ is a temperature constant In case of hybrid thermal LBM solver, the coupling of temperature back into the LBM is carried out by modifying the first order term of the equilibrium distribution such that the second moment results in actual pressure. The modified LBM equation is $$f_i(x+c_i\Delta t, t+\Delta t) = f_i(x, t) - \frac{1}{\tau}[f_i(x, t) - f_i^{eq}(x, t)] \quad (1.3)$$

where $$f_i^{eq} = \rho \omega_i \left[ \frac{P(\rho, T)}{\rho T_0} + \frac{c_i \cdot u}{T_0} + \frac{(c_i \cdot u)^2}{2T_0^2} - \frac{u^2}{2T_0} + \frac{(c_i \cdot u)^3}{6T_0^3} - \frac{(c_i \cdot u)u^2}{2T_0^2} \right] \quad (1.4)$$

$\{i = 1, q\}$ $$f_0^{eq} = \rho \omega_0 \left[ \frac{1}{\omega_0} - \frac{\beta P(\rho, T)}{\rho T_0} - \frac{u^2}{2T_0} + \dots \right]$$

In the above equation 1.4, P satisfies the actual equation of state. For ideal gas, $P=\rho RT$ and R is the gas constant. The factor $\beta$ in the stop state equilibrium is given by $$\frac{1}{\omega_0} \sum_{i=1}^{i=q} w_i$$

and q is the total number of moving lattice.

The above equilibrium modification does not alter the zero$^{th}$ and first order moment and results in correct thermodynamic pressure for second order moment, $$\sum_i f_i = \sum_i f_i^{eq} = \rho \quad (1.5)$$

$$\sum_i c_i f_i = \sum_i c_i f_i^{eq} = \rho u$$

$$\sum_i c_i c_i f_i^{eq} = PI + \rho u u$$

This approach requires minimal modification to the conventional LBM and the pressure obtained as a second moment includes all lattice directions. The critical disadvantage of this algorithm is the temperature range limit it imposes due to the changes in the leading order terms. For example, for ideal gas, the stop state distribution for D3Q19 lattice set becomes $$f_i^{eq} = \frac{\rho}{3}\left[ 3 - \frac{2RT}{T_0} - \frac{u^2}{2T_0} \right] \quad (1.5)$$

For high temperatures, $RT>1.5T_0$, the stop state equilibrium becomes negative and hence results in instability. Also for low temperatures $RT<T_0$ the positivity range of moving states reduces, which will also lead to instability at high velocities. Due to this drawback, most hybrid thermal LBM models are limited to low temperature range and low Mach number applications.

F. Approach Using Force Scheme

In another approach, the difference between pressure which arises from isothermal LBM and the actual equation of state are computed as follows $$F = \frac{1}{\rho}\nabla[\rho T_0 - P(\rho, T)] \quad (2.1)$$

The above term, F, is applied as an external body force. In order to avoid the discrete lattice effects of the body force, higher order force terms with modification to the velocity definition has to be employed. Since the force term added is the gradient of pressure, the positivity range of the equilibrium is not affected adversely. However, the computation of this additional force term requires finite difference calculations which affects the isotropic nature of the LBM. The computation of the gradients near the wall is also challenging, which could result in non zero normal velocity for high heat flux simulations.

G. Temperature Coupling Algorithm

As discussed in previous sections, conventional coupling methods have their own merits and demerits. In the case of altering leading order of equilibrium (section E), the pressure gradient obtained includes all lattice directions and it is simple to implement. However, altering the equilibrium reduces the positivity range and hence reduces the usability range of the LB solver. The introduction of the body force term (section F) does not affect the equilibrium and hence offers stability for wide range of speeds and temperatures. However, the computation of gradients using finite stencil affects the isotropic nature of the LB scheme and introduces errors like grid dependency, lattice orientation dependency and complexity in applying correct boundary conditions.

In this section, a temperature coupling algorithm is described to overcome the drawbacks of current methods. The linear stability analysis shows that the collision results in numerical instability whenever the equilibrium is negative. Further, the Chapmann multiscale expansion shows that the pressure gradient is the result of advection process. Hence it is possible to remove the temperature coupling out of the collision step and introduce during advection as follows $$f_i(x+c_i\Delta t, t+\Delta t) = f_i(x,t) + C_i(x,t) + [g_i(x+c_i\Delta t, t) - g_i(x,t)] \quad (3.1)$$

where the equilibrium distribution is identical to Eq. (1.2) and the pressure coupling term is given by $$g_i = \rho \omega_i \left[1 - \frac{P(\rho, T)}{\rho T_0}\right] \quad (3.2)$$

In this example, wherein $\rho$ is fluid density; $T_0$ is a constant lattice temperature; P is pressure in the volume of fluid; T is a temperature of the fluid during transport; and $w_i$ is a constant weighting factor. In the above equation 3.1, the first part is a mathematical expression of the collision process (i.e., $f_i(x,t)+C_i(x, t)$), where $C_i$ is a collision operator. The second of this equation is the thermodynamic step (e.g., $g_i(x, t+\Delta t)-g_i(x, t)$). By doing the multiscale analysis one can show that the second moment of the coupling term results in correct pressure gradient without affecting other quantities in mass and momentum conservation equations.

Another way of temperature coupling is to add the temporal variation also into the coupling as follows $$f_i(x+c_i\Delta t, t+\Delta t) = f_i(x,t) + C_i(x,t) + [g_i(x+c_i\Delta t, t+\Delta t) - g_i(x,t)] \quad (3.3)$$

The difference between Eq. [3.1] and Eq. [3.3] is that the new force term, g is computed at t+∆t. This introduces an additional time derivative term to the mass conservation. This can be eliminated simply by changing the stop state as follows $$f_0(x, t+\Delta t) = f_0(x, t) + C_0(x, t) - \sum_{i=1}^{i=q} [g_i(x, t+\Delta t) - g_i(x, t)] \quad (3.4)$$

These techniques for introducing the temperature during advection require minimal changes to the conventional LBM method. The algorithm for the temperature coupling with temporal changes, Eq. [3.3], is described below with regard to FIG. 12.

Figure 12:
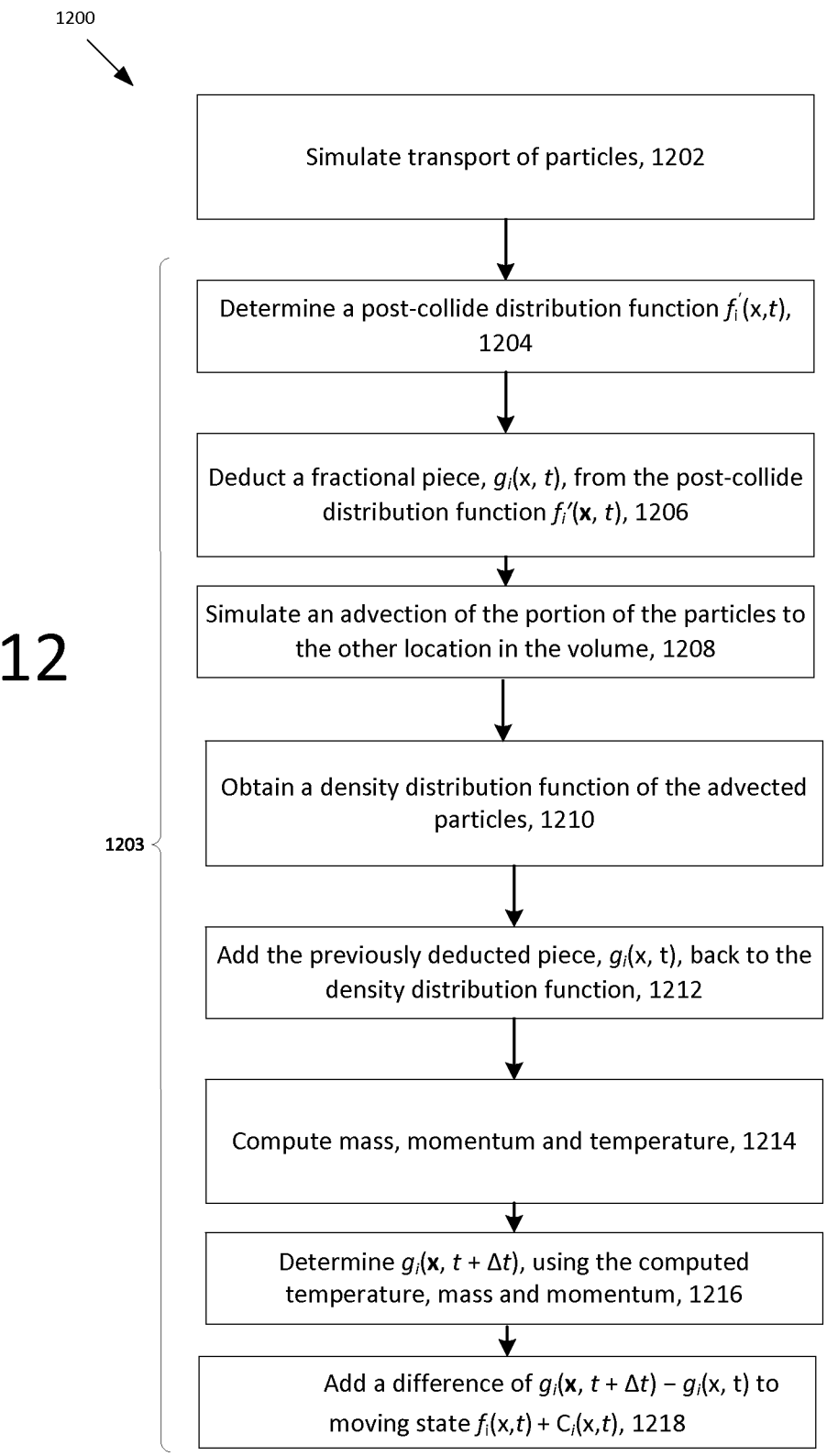
FIG. 12 is a flow chart of a process for generating a distribution function with a thermodynamic step that is independent from a particle collision step.

Referring to FIG. 12, a system implements process 1200 in generating a distribution function of particle transport, in which the thermodynamic step is separate from the collision step. In this example, the distribution function comprises an advection step, and the thermodynamic step is included in the distribution portion by augmenting the advection step with the thermodynamic step, rather than augmenting the particle collision step with the thermodynamic step. Generally, advection includes the transport of particles (e.g., in a horizontal direction from one region to another region). In this example, thermodynamic step includes a temperature of the volume of fluid during the transport.

In operation, the system simulates (1202), in a lattice velocity set, transport of particles in a volume of fluid, with the transport causing collision among the particles. The system also generates (1203) a distribution function for transport of the particles, wherein the distribution function comprises a thermodynamic step and a particle collision step, and wherein the thermodynamic step is substantially independent of and separate from the particle collision step. The process of generating includes actions 1204, 1206, 1208, 1210, 1212, 1214, 1216, 1218.

In the example of FIG. 12, the system determines (1204) determining a post-collide distribution function $f_i'$ (x,t) for the collision at a particular location x in the volume of fluid at a particular time t, wherein $f_i'$ (x,t)=$f_i$(x,t)+$C_i$(x,t), wherein $C_i$ is a collision operator, and $f_i$ is a distribution function for the particles prior to the collision.

In this example, the system deducts (1206) a fractional piece, $g_i$(x, t), from the post-collide distribution function $f_i'$ (x, t) to obtain pre-advect particle density distribution function $f_i''$ (x,t)=$f_i'$ (x, t)−$g_i$(x, t), with $g_i$(x, t) representing the fraction of the particles that has to be retained at same location during advection (e.g., a distribution function for the portion of the particles that are unadvected during the advection step). In this example, the system divides the particles into a first portion $f_i$(x, t)−$g_i$(x, t), which are advected as described below, and a second portion, $g_i$(x, t), which are unadvected during advection step.

The system simulates (1208) an advection of the second portion of the particles to the other location (e.g., neighbor cells) in the volume of fluid at a time t+∆t, with the other location being represented as (x+$c_i$∆t), with $c_i$ being a velocity vector of the particles prior to collision, and with ∆t being an interval between the particular time t and another point in time. In an example, the particles are advected to the neighbor cells along discrete particle velocity directions. The portion of the particles that are advected are the second portion of particles (e.g., $f_i'$ (x,t)−$g_i$(x,t)). The system obtains (1210), based on simulation of the advection, a density distribution function $\hat{f}_i$(x, t+∆t) of the advected particles, wherein $\hat{f}_i$(x, t+∆t=$f_i''$(x−$c_i$∆t, t). $\hat{f}_i$(x, t+∆t) is the distribution at location x advected from location x−$c_i$, as described below. In this example, $f_i''$ (x−$c_i$∆t,t) represents the pre-advect particle density distribution function at location x−$c_i$∆t at time t. The term x−$c_i$∆t represents another location (e.g., in a neighbor cell) from which the particles are advected to location x. The other location $x-c_i\Delta t$ is based on the original location x and a distance that the particles can move (based on velocity value $c_i$) in time interval $\Delta t$. The equation $\hat{f}_i(x, t+\Delta t)=f_i''(x-c_i\Delta t,t)$ represents that the distribution of the particles at location x at time $t+\Delta t$ is the same as pre-advect particle density distribution function at location $x-c_i\Delta t$ at time t, as the particles at location $x-c_i\Delta t$ are being advected to location x.

The system adds (1212) the previously deducted piece, $g_i(x, t)$, back to the density distribution function $\hat{f}_i(x, t+\Delta t)$ (which advected from the neighbor cells) to form a post-advect density distribution function:

$$f_i(x,t+\Delta t)=\hat{f}_i(x,t+\Delta t)+g_i(x,t)=f_i''(x-c_i\Delta t,t)+g_i(x,t),$$

which is also expressed as:

$$f(x, t + \Delta t) = \hat{f}(x, t + \Delta t) + g_i(x, t)$$
$$= f''(x - c_i\Delta t, t) + g_i(x, t)$$
$$= f(x - c_i\Delta t, t) + C_i(x - c_i\Delta t, t) +$$
$$[g(x, t) - g_i(x - c_i\Delta t, t))$$

In this example, adding the previously deducted piece, $g_i(x, t)$, back to the density distribution results in conservation of mass. Also the addition recovers Eq. 3.1 as it can be seen by the addition of $c_i$ to the location vector x of all terms in the above equation.

The system computes (1214) mass, momentum and temperature of the particles at location x at time $t+\Delta t$. The system determines (1216) $g_i(x, t+\Delta t)$, using the computed temperature, mass and momentum. The system adds (1218) a difference of $g_i(x, t+\Delta t)-g_i(x, t)$ to each moving state $f_i(x,t+\Delta t)$, to account for time variation of the temperature coupling. This action recovers the Eq. [3.3] as follows $$f(x, t + \Delta t) = f(x - c_i\Delta t, t) + C_i(x - c_i\Delta t, t) +$$
$$(g(x, t) - g_i(x - c_i\Delta t, t)] + [g_i(x, t + \Delta t) - g_i(x, t)]$$
$$= f(x - c_i\Delta t, t) + C_i(x - c_i\Delta t, t) +$$
$$[g(x, t + \Delta t) - g_i(x - c_i\Delta t, t)).$$

The number of particles added to the moving stated in the above state are subtracted from the stop state to conserve mass as per Eq. (3.4). The summation of g terms in Eq. (3.4) represents the difference in number of particles between the g groups of particles at time t and at time $t+\Delta t$ from the non-stop states. The system introduces a summation term in the equation for the stop state is to replenish the difference so as to ensure an overall mass conservation. The system repeats actions 1204, 1206, 1208, 1210, 1212, 1214, 1216, 1218. The whole cycle repeats from one time step t to subsequent time step $t+\Delta t$, and so forth.

In an example, equations 3.1 and 3.3 are obtained when particles with a velocity $c_i$ at location at $x+c_i$ are advected from location x, rather than particles with velocity $c_i$ at location x are advected from location $x-c_i$. To get the equation for 3.1, the system repeats the actions included in process 1200, except g is computed (at action 1216) at time t at location $x+c_i\Delta t$.

Using the techniques described herein, the equilibrium distribution ($f_i^{eq}$) is unaltered in the distribution function (e.g., $f_i(x+c_i\Delta t, t+\Delta t)$ and hence the stability range remains same as that of the isothermal LBM. This makes the simulation of high Mach and high temperature range applications possible. Additionally, the pressure gradient computed as a result of advection involves all the lattice directions, which retains the isotropic nature of the LBM solver. Conservation of the local momentum is ensured as there are no additions of forces computed using finite difference approximation. The velocity definition is exact unlike the force method, which requires an alternate velocity definition to remove the discrete lattice effects. The techniques described herein are computationally inexpensive, as it involves no extensive pressure gradient computations and the complex boundary treatments. These techniques also have simpler boundary conditions that ensure accurate pressure gradient in the near wall region, resulting in correct velocity profiles. This is critical for the prediction of the heat flux for high temperature applications. These techniques can be readily extended to any LBM applications involving a conservative force, like magnetic force, gravity, intercomponent force in a multiphase application, and so forth.

Figure 13:
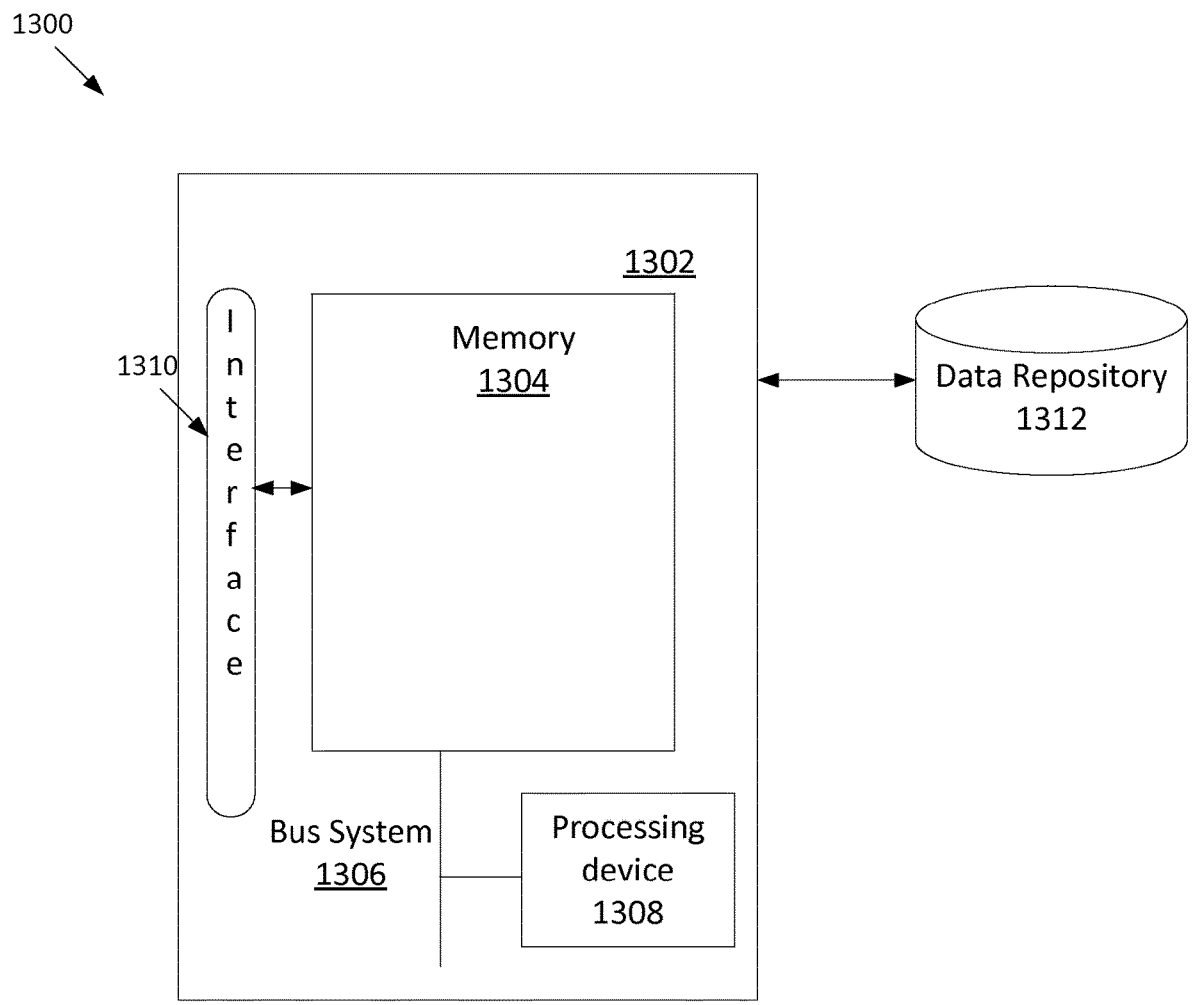
FIG. 13 is a block diagram of components of a system for generating a distribution function with a thermodynamic step that is independent from a particle collision step.

FIG. 13 is a block diagram of components of network environment 1300. Network environment 1300 also includes system 1302 (for implementing the techniques described herein), which includes memory 1304, a bus system 1306, and a processor 1308. Memory 1304 can include a hard drive and a random access memory storage device, such as a dynamic random access memory, machine-readable hardware storage device, machine-readable media, or other types of non-transitory machine-readable storage devices. A bus system 1306, including, for example, a data bus and a motherboard, can be used to establish and to control data communication between the components of system 1302. Processor 1308 may include one or more microprocessors and/or processing devices. Generally, processor 1308 may include any appropriate processor and/or logic that is capable of receiving and storing data, and of communicating over a network (not shown).

System 1302 can be any of a variety of computing devices capable of receiving data, such as a server, a distributed computing system, a desktop computer, a laptop, a cell phone, a rack-mounted server, and so forth. System 1302 may be a single server or a group of servers that are at a same location or at different locations. The illustrated system 1302 can receive data via input/output ("I/O") interface 1310. I/O interface 1310 can be any type of interface capable of receiving data over a network, such as an Ethernet interface, a wireless networking interface, a fiber-optic networking interface, a modem, and so forth. System 1302 is configure for communication with data repository 1312, which may be configured to store velocity models, simulation data and so forth.

Embodiments can be implemented in digital electronic circuitry, or in computer hardware, firmware, software, or in combinations thereof. Apparatus of the techniques described herein can be implemented in a computer program product tangibly embodied or stored in a machine-readable media (e.g., hardware storage device) for execution by a programmable processor; and method actions can be performed by a programmable processor executing a program of instructions to perform operations of the techniques described herein by operating on input data and generating output. The techniques described herein can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of implementations have been described. Nevertheless, it will be understood that various modifications may be made without departing from the spirit and scope of the claims. Accordingly, other implementations are within the scope of the following claims.

What is claimed is:

1. A computer implemented method for generating a stable distribution for particles for simulating fluid flows of a fluid over a range of temperatures relative to a given constant lattice temperature, the method comprising:
receiving by one or more computer systems, a model of a simulation space including a lattice structure represented as a collection of voxels, and a representation of a physical object, with the voxels having appropriate resolutions to account for surfaces of the physical object;
simulating by a computer using a collision operator and state vectors for storing a lattice velocity set for each voxel, transport of particles in a volume of fluid in the simulation space, with the transport causing collisions among the particles, according to the collision operator;
computing from a particle distribution function that includes a thermodynamic function that is separate from simulating collisions, transport of the particles, with the thermodynamic function used to determine the one or more thermodynamic properties of the particles in the volume of fluid; and
simulating advection of the particles to subsequent locations in the lattice velocity set based at least in part on the one or more computed thermodynamic properties.

2. The method of claim 1, wherein the thermodynamic function is given by $g_i$ and is included in simulating advection, with $g_i$ given by:

$$g_i = \rho w_i \left[1 - \frac{P(\rho, T)}{\rho T_0}\right],$$

wherein $\rho$ is fluid density, wherein $T_0$ is a constant lattice temperature, P is pressure in the volume of fluid, T is the computed temperature, and $w_i$ is a constant weighting factor.

3. The method of claim 1, wherein the one or more determined thermodynamic properties includes a temperature of the volume of fluid during the transport.

4. The method of claim 1, wherein simulating further includes:
calculating a post-collide distribution using a post-collide distribution function $f_i(x,t)$ that includes the collision operator for a collision at a particular location x in the volume of fluid at a particular time t, with the post-collide distribution function given as $f_i'(x,t)=f_i(x,t)+C_i(x,t)$, with $C_i$ being the collision operator, and $f_i$ being the distribution function for the particles prior to the collision; and with simulating advection further comprising:
simulating advection of the portion of the particles to the subsequent location in the volume of fluid occurring at a time $t+\Delta t$, with the subsequent location being represented as $(x+c_i\Delta t)$, with $c_i$ being a velocity vector of the particles prior to collision, and with $\Delta t$ being an interval between the particular time t and another point in time;
computing mass, momentum and temperature of the particles at location x at time $t+\Delta t$;
determining $g_i(x, t+\Delta t)$, using the computed temperature, mass and momentum; and
adding a difference of $g_i(x, t+\Delta t)-g_i(x, t)$ to a moving state $f_i(x,t+\Delta t)$.

5. The method of claim 4, wherein $g_i$ is defined in accordance with $$g_i = \rho w_i \left[1 - \frac{P(\rho, T)}{\rho T_0}\right],$$

wherein $\rho$ is fluid density, $T_0$ is a constant lattice temperature, P is pressure in the volume of fluid, T is the computed temperature, and $w_i$ is a constant weighting factor.

6. The method of claim 4, wherein the generated distribution function is in accordance with:

$$f_i(x+c_i\Delta t,t+\Delta t)=f_i(x,t)+C_i(x,t)+[g_i(x+c_i\Delta t,t+\Delta t)-g_i(x,t)],$$

wherein x is a particular location within the volume, t is a particular first point in time, i is an index number of lattice velocities in the set, $c_i$ is a velocity vector of the particles prior to collision, $C_i$ is a collision operator, $\Delta t$ is an interval between the first point in time and a second point in time, $g_i$ is the thermodynamic function, and $f_i$ is a distribution function for the particles at location x at time t.

7. The method of claim 4, further comprising:
conserving the mass by modifying a stop state to be in accordance with:

$$f_0(x, t+\Delta t) = f_0(x, t) + C_0(x, t) - \sum_{i=1}^{i=q} [g_i(x, t+\Delta t) - g_i(x, t)].$$

8. The method of claim 1, wherein the particle collision step includes an isothermic equilibrium distribution function.

9. The method of claim 1, wherein the distribution function is a distribution function for the particles at a location $x+c_i\Delta t$ and at a time $t+\Delta t$ and is represented as:

$$f_i(x+c_i\Delta t,t+\Delta t)=f_i(x,t)+C_i(x,t)+[g_i(x+c_i\Delta t,t+\Delta t)-g_i(x,t)],$$

wherein x is a particular location within the volume, t is a particular first point in time, i is an index number of lattice velocities in the set, $c_i$ is a velocity vector of the particles prior to collision, $C_i$ is a collision operator, $\Delta t$ is an interval between the first point in time and a second point in time, $g_i$ is the thermodynamic function, and $f_i$ is a distribution function for the particles at location x at time t.

10. The method of claim 9, wherein $g_i$ is defined in accordance with $$g_i = \rho w_i \left[1 - \frac{P(\rho, T)}{\rho T_0}\right];$$

wherein $\rho$ is fluid density, $T_0$ is a constant lattice temperature, P is pressure in the volume of fluid, T is the computed temperature, and $w_i$ is a constant weighting factor.

11. The method of claim 1, wherein the lattice velocity set is based on the Lattice Boltzmann method.

12. One or more machine-readable hardware storage devices storing instructions for generating a stable distribution for particles for simulating fluid flows of a fluid over a range of temperatures relative to a given constant lattice temperature, with the instructions being executable by one or more processing devices to cause a system to:
receive a model of a simulation space including a lattice structure represented as a collection of voxels, and a representation of a physical object, with the voxels having appropriate resolutions to account for surfaces of the physical object;
simulate using a collision operator and state vectors for storing a lattice velocity set for each voxel, transport of particles in a volume of fluid in the simulation space, with the transport causing collision among the particles, according to the collision operator; and
compute from a particle distribution function that includes a thermodynamic function that is separate from instructions to simulate collisions transport of the particles, with the thermodynamic function, used to determine the thermodynamic properties of the particles in the volume of fluid; and
simulate advection of the particles to subsequent locations in the lattice velocity set based at least in part on the computed thermodynamic properties.

13. The one or more machine-readable hardware storage devices of claim 12, wherein the thermodynamic function is given by $g_i$ and is included the advection with $g_i$ given by:

$$g_i = \rho w_i \left[1 - \frac{P(\rho, T)}{\rho T_0}\right];$$

wherein $\rho$ is fluid density, $T_0$ is a constant lattice temperature, P is pressure in the volume of fluid, T is the computed temperature; and $w_i$ is a constant weighting factor.

14. The one or more machine-readable hardware storage devices of claim 12, wherein a first one of the one or more thermodynamic properties of the computed transport distribution is a temperature of the volume of fluid during the transport.

15. The one or more machine-readable hardware storage devices of claim 12, wherein instructions to simulate includes instructions to:
calculate a post-collide distribution using a post-collide distribution function $f_i'(x,t)$ that includes the collision operator for a collision at a particular location x in the volume of fluid at a particular time t, with the post-collide distribution function given as $f_i'(x,t)=f_i(x,t)+C_i(x,t)$, with $C_i$ being the collision operator, and $f_i$ being the distribution function for the particles prior to the collision; and with instructions to simulate advection further comprising instructions to:
simulate advection of the portion of the particles to the subsequent location in the volume of fluid occurring at a time $t+\Delta t$, with the subsequent location being represented as $(x+c_i\Delta t)$, with $c_i$ being a velocity vector of the particles prior to collision, and with $\Delta t$ being an interval between the particular time t and another point in time;
compute mass, momentum and temperature of the particles at location x at time $t+\Delta t$;
determine $g_i(x, t+\Delta t)$, using the computed temperature, mass and momentum; and
add a difference of $g_i(x, t+\Delta t)-g_i(x, t)$ to a moving state $f_i(x, t+\Delta t)$.

16. The one or more machine-readable hardware storage devices of claim 15, wherein $g_i$ is defined in accordance with $$g_i = \rho w_i \left[1 - \frac{P(\rho, T)}{\rho T_0}\right];$$

wherein $\rho$ is fluid density, $T_0$ is a constant lattice temperature, P is pressure in the volume of fluid, T is the computed temperature, and $w_i$ is a constant weighting factor.

17. The one or more machine-readable hardware storage devices of claim 15, wherein the generated distribution function is in accordance with:

$$f_i(x+c_i\Delta t, t+\Delta t) = f_i(x,t) + C_i(x,t) + [g_i(x+c_i\Delta t, t+\Delta t) - g_i(x,t)];$$

wherein x is a particular location within the volume, t is a particular first point in time, i is an index number of lattice velocities in the set, $c_i$ is a velocity vector of the particles prior to collision, $C_i$ is a collision operator, $\Delta t$ is an interval between the first point in time and a second point in time, $g_i$ is the thermodynamic step, and $f_i$ is a distribution function for the particles at location x at time t.

18. The one or more machine-readable hardware storage devices of claim 15, wherein the operations further comprise:
conserving the mass by modifying a stop state to be in accordance with:

$$f_0(x, t+\Delta t) = f_0(x, t) + C_0(x, t) - \sum_{i=1}^{i=q} [g_i(x, t+\Delta t) - g_i(x, t)].$$

19. The one or more machine-readable hardware storage devices of claim 12, wherein the particle collision step includes an isothermic equilibrium distribution function.

20. The one or more machine-readable hardware storage devices of claim 12, wherein the distribution function is a distribution function for the particles at a location $x+c_i\Delta t$ and at a time $t+\Delta t$ and is represented as:

$$f_i(x+c_i\Delta t, t+\Delta t) = f_i(x,t) + C_i(x,t) + [g_i(x+c_i\Delta t, t+\Delta t) - g_i(x,t)];$$

wherein x is a particular location within the volume, t is a particular first point in time, i is an index number of lattice velocities in the set, $c_i$ is a velocity vector of the particles prior to collision, $C_i$ is a collision operator, $\Delta t$ is an interval between the first point in time and a second point in time, $g_i$ is the thermodynamic function, and $f_i$ is a distribution function for the particles at location x at time t.

21. The one or more machine-readable hardware storage devices of claim 20, wherein $g_i$ is defined in accordance with $$g_i = \rho w_i \left[1 - \frac{P(\rho, T)}{\rho T_0}\right];$$

wherein $\rho$ is fluid density, $T_0$ is a constant lattice temperature, P is pressure in the volume of fluid, T is the computed temperature, and $w_i$ is a constant weighting factor.

22. The one or more machine-readable hardware storage devices of claim 12, wherein the lattice velocity set is based on the Lattice Boltzmann method.

23. A system comprising:
one or more processing devices; and
one or more machine-readable hardware storage devices storing instructions for generating a stable distribution for particles for simulating fluid flows of a fluid over a range of temperatures relative to a given constant lattice temperature, with the instructions being executable by the one or more processing devices to cause the processing devices to:

receive a model of a simulation space including a lattice structure represented as a collection of voxels, and a representation of a physical object, with the voxels having appropriate resolutions to account for surfaces of the physical object;

simulate using a collision operator and state vectors for storing a lattice velocity set for each voxel, transport of particles in a volume of fluid in the simulation space, with the transport causing collision among the particles, according to the collision operator; and compute from a particle distribution function that includes a thermodynamic function that is separate from instructions to simulate collisions transport of the particles, with the thermodynamic function, used to determine the thermodynamic properties of the particles in the volume of fluid; and simulate advection of the particles to subsequent locations in the lattice velocity set based at least in part on the computed thermodynamic properties.

* * * * *

UNITED STATES PATENT AND TRADEMARK OFFICE
CERTIFICATE OF CORRECTION

PATENT NO. : 10,762,252 B2
APPLICATION NO. : 14/909055
DATED : September 1, 2020
INVENTOR(S) : Pradeep Gopalakrishnan, Raoyang Zhang and Hudong Chen Page 1 of 1

It is certified that error appears in the above-identified patent and that said Letters Patent is hereby corrected as shown below:

Column 24, Line 4, Claim 4, delete "$f_i(x,t)$" and insert -- $f'_i(x,t)$ --;

Column 24, Line 63, Claim 9, delete "$[g_i(x + c_i\Delta t, t + \Delta t)]$" and insert -- $[g_i(x + c_i\Delta t, t)]$ --;

Column 25, Line 45, Claim 13, delete "the" and insert -- in simulating --;

Column 26, Line 59, Claim 30, delete "$[g_i(x + c_i\Delta t, t + \Delta t)]$" and insert -- $[g_i(x + c_i\Delta t, t)]$ --.

Signed and Sealed this
Third Day of November, 2020

Andrei Iancu
*Director of the United States Patent and Trademark Office*